B. SEVERSON.
Car Wheel.
No. 11,233. Patented July 4, 1854.
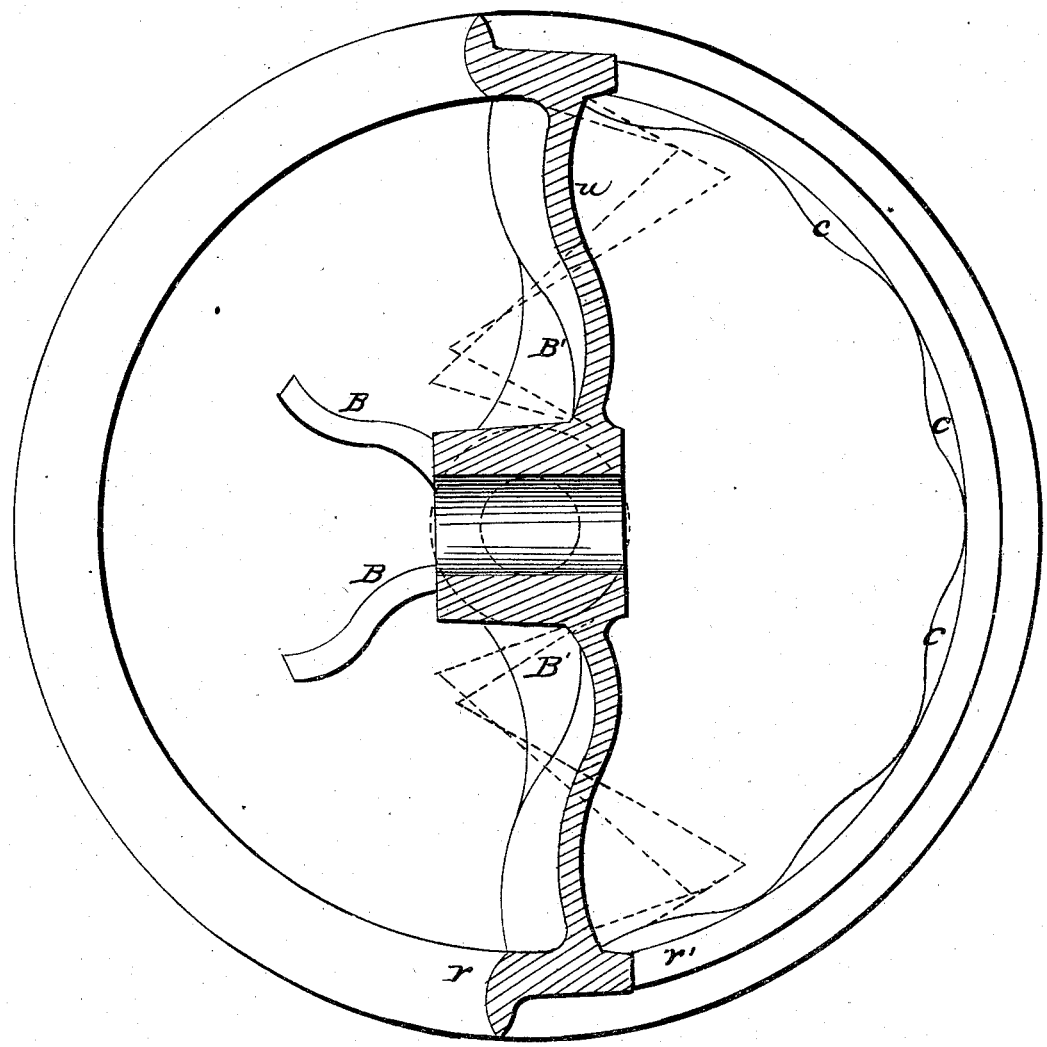

UNITED STATES PATENT OFFICE.

BENJAMIN SEVERSON, OF PHILADELPHIA, PENNSYLVANIA.

CAST-IRON CAR-WHEEL.

Specification of Letters Patent No. 11,233, dated July 4, 1854.

*To all whom it may concern:*

Be it known that I, BENJAMIN SEVERSON, of Philadelphia, in the county of Philadelphia and State of Pennsylvania, have invented an Improvement in Cast-Iron Car-Wheels, of which the following is a full, clear, and exact specification.

The nature of my invention consists in a new form of web, used to connect the rim and hub of castiron car-wheels, so combined with the hub and rim, and a peculiar, though not wholly new form of brackets about the hub, as will very much simplify the process of molding and casting—avoid the necessity of annealing the wheels, and insure a more perfect wheel than has yet been known.

Attempts at improvement have been so often made, that this business might seem, or be supposed to be perfect. Still, as improvements have been made in this business within the last few years, it is possible that further attempts may be equally, if not more successful.

I have obtained Letters Patent for two different forms of car-wheels. Both of them make good wheels, but the last is much better and cheaper than the first. And I believe the last has important advantages over any other wheel now in use. Still, the one I now present is quite as good, and far more simple and economical in construction than the other. For I have found some inconvenience in making the other, which will not occur in this. For that, having the reversed corrugations, like all ordinary corrugations, that extend to the hub; as frequent at the hub as at the rim, I find quite difficult to make. For these reasons, when the corrugations in the outer part of the web are as frequent as is necessary to support the rim well, then, on account of their natural convergence, they will be too close or frequent at the hub. For, to support the rim well of a 33 inch wheel, will require ten or twelve corrugations in that part of the web which joins to the rim. If this number of corrugations is carried radially to the hub, they will be so close and deep in this part of the web, as to make the molding of this part very difficult, and if it were well molded, some portions of this part of the mold will be so slender, as to be sure to break, or wash when the fluid metal is run against them. But as it seems to be almost universally, and I believe, properly conceded, that a good and every way economical castiron car-wheel, must consist of one single solid piece, and that there must be no openings between the rim and hub, I believe that no better connection can be devised than a single plate or web. And I believe that the rim can in no way be better and more economically supported, than by having the outer part of this web, where it joins to the rim, properly corrugated. But to do this well, will require a greater number of corrugations than can be continued to the hub, without making them at the hub too frequent, as before stated. Therefore, to secure all the advantages of having a connection between the rim and hub formed of a single solid web, and all practical advantages of having the web corrugated, so as to support the rim well, in the most economical manner—to make its molding easy—to leave a mold that will not wash in casting, to have the whole—patterns, mold, and casting, of the simplest and best practical form—to secure all these advantages, and avoid the defects of other corrugated wheels, I have devised this new form of web, and given to it, where it joins to the rim, just so many corrugations as may be necessary to support the rim well. And I make the corrugations gradually to lessen in depth as they approach the hub, so that at the hub, they will wholly disappear—so that this part of the web will be quite plain. And to give this part of the web sufficient lateral depth and strength, to support the hub well and yet leave a good strong mold, that will not wash, I place against the inner side of the web, and against the hub, just so many brackets as may be required for this purpose; and not so many as to make the molding or casting of this part difficult. And to give to the whole abundant compensation for contraction in cooling, I give to the web, and to the brackets, a compound curved form, as will appear in the drawing.

To enable others skilled in the art to make wheels of this improved form, I will proceed to describe my invention by an explanation of the drawing.

In Figure 1, is a cross section of the wheel taken through its center, showing a section of the hub and axle, cross section of rim marked $r$, of web marked $w$. The dark part marked Back of web, shows the depth and form of the corrugations, how they diminish in depth from the rim and wholly disappear at the hub. At the right of the section, and marked, Face of wheel, is represented the outside of one half of the wheel. The dark parts marked C, are parts of the rim and show how the corrugated web is joined to the rim. At the left of the section, and marked Back of wheel, is represented the inner side of the wheel—B, B, the edges of compound curved brackets. The sides of these brackets are represented in, and against the cross section, and are marked B', B'. The corrugations of the web between the rim and hub are only represented in the section, as it would require considerable time and skill to represent them truly in the face of the web, and it is believed not to be required, as the section is all that a workman of ordinary skill will require or need, to understand it.

I do not claim any part of the rim nor hub, nor connecting them with a solid web, neither do I claim common corrugations nor brackets, but What I do claim as my invention, and desire to secure by Letters Patent, is—

A castiron web, deeply corrugated where it joins to the rim, with the corrugations gradually lessening in depth as they approach toward the center of the wheel, so as wholly to disappear at or near the hub; when it is used for the purpose of uniting a rim and hub, and has its central part strengthened by means of brackets, all substantially in the manner and for the purposes set forth.

BENJAMIN SEVERSON.

Witnesses:
JOHN McARTHUR, Jr.,
ELIAS AUGUST JOHNSEN.